United States Patent Office 3,360,110
Patented Dec. 26, 1967

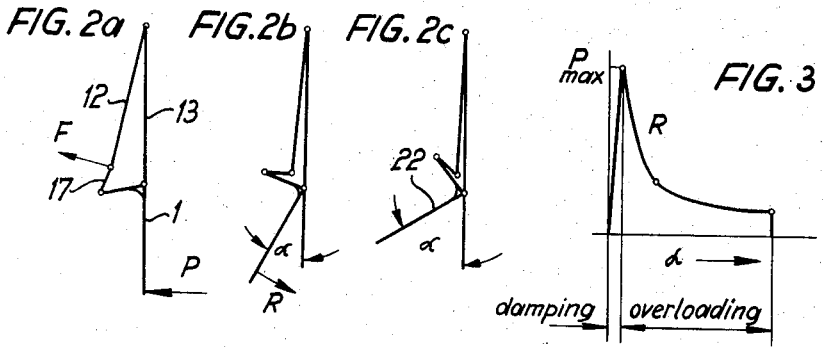
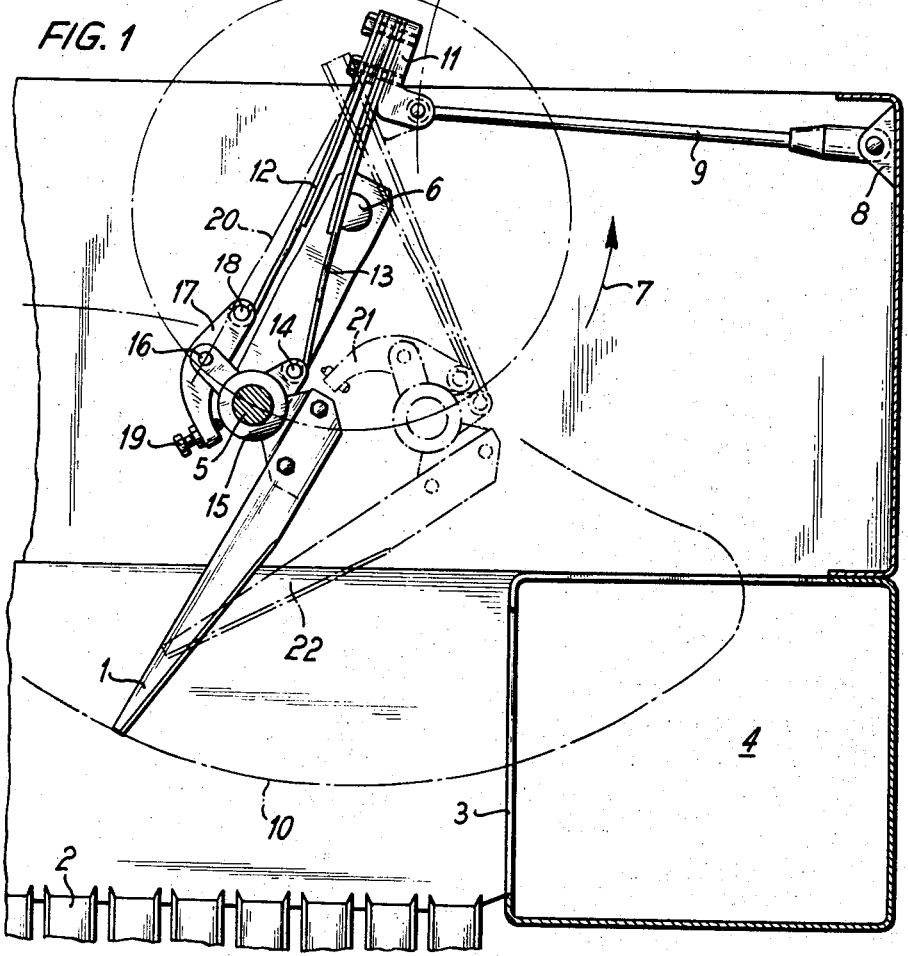

3,360,110
OVERLOAD SAFETY DEVICE FOR CONVEYING RAKE FOR HARVESTING MACHINES
Wolfgang Eder and Jürgen Simonis, Wolfenbuttel, Germany, assignors to Gebruder Welger, Wolfenbuttel, Germany
Filed Nov. 23, 1966, Ser. No. 596,609
Claims priority, application Germany, Nov. 25, 1965, W 40,379
10 Claims. (Cl. 198—222)

ABSTRACT OF THE DISCLOSURE

A conveying rake is disclosed as swingably mounted on a pivot which is cyclically moved in a conveying direction. Toggle joint means connect the rake to a supporting frame. The toggle joint means include a pair of pivotally interconnected links, and spring means biasing the links to a nearly fully extended position in which the rake is held angularly oriented in an operative position.

When the resistance moment on the rake extends a predetermined value, as the pivot is moved in the conveying direction, the links swing toward each other to a contracted position in which the rake is angularly displaced rearwardly to an inoperative position. When the pivot moves the rake in a retracting direction, the spring means biases the links back to the nearly fully extended position to angularly displace the rake to the operative position.

Background of the invention

This invention relates to conveying rakes for agricultural harvesting machines and, more particularly, to a novel overload safety or release device for such rakes providing for fast movement of the rake to an inoperative position upon occurrence of an overload, and for automatic return of the rake to an operating position when the overload is removed.

The invention is particularly applicable to a conveying rake, for agricultural harvesting machines, which is driven by a continuously rotating crank and whose motion is further controlled by a rocker connected to the rake and to a frame. Conveying rakes of this type, which are in part designed also as individual tines, are used, by way of example, as transverse conveyors on pick-up type high-density balers. In such applications, the conveying rakes convey hay or straw, deposited on a table by a pick-up, laterally to a baling device. In cooperating with the balers, these rakes are further used as so-called "packers" in order to stuff or press the harvested material through a lateral filling opening into the bale chamber. In loading trailers, it is known practice to remove the harvested material from the pick-up using the conveying rake, and further to use the conveying rake, exerting more or less pressure, to push the material through a channel into a loading space. Consequently, great forces are transmitted by such conveying rakes, especially if, in addition to merely conveying the harvested material, they also compress or pre-bale the material.

The conveyed material may contain solid lumps and foreign bodies. To dampen the sharp impact when the conveying tines impinge on such lumps or bodies, it is customary to incorporate, either in the rocker or in the conveying rake itself, a spring element, such as compression springs or rubber buffers, permitting a slight deviation or deflection of the conveying tines.

In addition, however, it is necessary to provide an overload safety device either to disconnect the conveying rake or to move it out of the conveying path, in order to avoid, in the case of obstructions, breakage of the machine parts and thus serious damage. For this purpose, it is known to use, as a safety element, a shearing pin on the conveying rake. After the shearing pin is sheared off, the rake or its tines can fall into a position inoperative for conveying material.

In other known designs, the conveying rake is provided with interchangeable wooden tines, whose resistance to breakage limits the conveying pressure which can be applied. Both of these solutions are unsatisfactory in practice, as the loading operation must be interrupted in order to insert new parts. This is not only time-consuming but, in the case of wooden tines, it is also expensive.

Additionally, with both expedients the moment at which the safety device is operable to respond cannot be exactly adjusted, because an exact shearing resistance or breakage resistance cannot be guaranteed either with a shearing pin and, even less so, with wooden tines. Furthermore, the user only too often may insert replacement bolts or replacement tines of a material having a different strength than the original pin or tines.

Accordingly, an object of the present invention is to provide, for conveying rakes, an overload safety device which is not broken or destroyed upon occurrence of an overload.

Another object of the present invention is to provide, in a conveying rake, an overload safety device which, even after operation, provides for continuation of the work without loss of time and desirably without any interruption of the work.

A further object of the invention is to provide, in a conveying rake, an overload safety device capable of exact adjustment with respect to the response moment on the conveying rake.

Yet another object of the invention is to provide, in a conveying device, an overload safety device of the type mentioned and in which the moment to which the safety device is responsive is infinitely adjustable by a suitable setting means, such as a screw or an eccentric.

In accordance with the invention, the conveying rake is mounted for pivoting about a pivot bolt, and is held in a conveying position or orientation by two links which are under the bias of a spring means serving as the overload safety device, and acting in the fashion of a toggle lever, to assume an almost fully extended rectilinear position. With this arrangement, the conveying rake operates, up until the time the overload safety device responds, without any angular deviation from its optimum conveying direction or orientation. After response of the overload safety device, the spring means exerts a restoring force on the conveying rake so that, after being withdrawn from the obstacle, the conveying rake is automatically restored from its inoperative position or orientation to its conveying position or orientation. Thus, with the next conveying stroke, the rake can again act in a conveying manner and with full force on the obstructing obstacle.

In order to maintain the weight of the moving parts as low as possible, it is advantageous if one of the two links is designed as a leaf spring which can have the additional function of acting as the overload spring. It is particularly advantageous, with regard to the structural accommodation of the required spring and of the required spring displacement, if a toggle lever link as well as a connecting brace forming the connection between the bearing head of the rocker and the conveying link are designed as leaf springs which are commonly clamped at one end and curved away from each other in opposite directions at the other end.

The customary impact damping, effective when the conveying tines impinge on lumps or foreign bodies, can be effected by designing the connecting brace as a leaf spring whose free end curves in the conveying position or orientation of the rake and which tends to straighten to dampen impacts.

For an understanding of the principles of the invention, reference is made to the following description of a typical embodiment thereof as illustrated in the accompanying drawings.

In the drawings:

FIG. 1 is a side elevation view, partly in section, of a conveying rake embodying the invention;

FIGS. 2a, 2b and 2c are kinematic illustrations of three positions of the conveying rake; and FIG. 3 is a curve graphically illustrating the variation of the restoring force at the tip of the conveying rake as a function of the angular displacements of the conveying rake toward its inoperative position.

In the drawings, a conveying rake embodying the invention is illustrated as incorporated in a known packer of a pick-up press or baler. Thus, conveying rake 1 stuffs the harvested material, which is either lifted by a pick-up 2 or pushed toward it by a transverse conveyor, through a filling opening 3 into the bale chamber 4 of a baler or other packing device. Rake 1 is driven by a crank 5 which rotates continuously, in the direction of arrow 7, about a bearing 6 in the frame of the apparatus. The conveying rake is so controlled by a rocker 9 which is swingably secured at one end in a bearing 8 on the frame and connected pivotally at its other end to rake 1, that the tip of the rake describes the curved path 10.

The connection between conveying rake 1 and the bearing head 11 of rocker 9 is provided by two curved leaf springs 12 and 13. These springs are conjointly clamped in bearing head 11 in such a manner that, in their untensioned state, they curve away from each other in opposite directions. Spring 13 is connected by a pin or pivot 14 with a bearing tube or sleeve 15 of rake 1. A second bearing pivot or pin 16 on hub 15 of rake 1 mounts a two-arm lever 17. One arm of lever 17 is pivotally connected, at a pivotal connection 18, with leaf spring 12 in such a manner that both leaf springs are tensioned toward each other and press bearings 14 and 18 toward each other.

By means of the setting screw 19, pivotal joint 18 can be adjusted to any desired distance from the dash-dot connecting line 20 extending between bearing pin 16 and the spring clamping point on bearing head 11.

If joint 18 were adjusted so as to lie in the connecting line 20, toggle levers 12 and 17 would be in the fully extended substantially rectilinear position. A bending of spring 12 upon overload of conveying rake 1 could not occur under this condition. However, if joint 18 is adjusted to a suitable spacing from connecting line 20, through the medium of adjusting means 19, when the desired response moment is exceeded, lever 17 flaps about bearing pin 16 inwardly into the position 21 shown in broken lines. Correspondingly, conveying rake 1 is swung into the inoperative position 22 also shown in broken lines. In this position, and due to their differing lengths, or due to the distance between the bearings 14 and 18 considered lengthwise of the springs, leaf springs 12 and 13 exert a small turning movement or torque on the bearing tube 15 to turn the same about the shaft 5. Thereby, rake 1 slides, with only a slight pressure, over the accumulated harvested material and automatically flaps into the solid line conveying position upon being retracted from channel 4. Thus, during the next conveying stroke of rake 1, the rake is again operative on the material.

Leaf spring 13, serving as the brace or connection between bearing head 11 and conveying rake 1, still has an outward curvature in the operative position of the rake, even after it has been tensioned. When conveying rake 1 is loaded, spring 13 is pulled into an extended position. The resulting elastic flexibility of rake 1 through a small angle dampens the impact when the rake hits hard objects.

FIGS. 2a, 2b and 2c show the deflection of the toggle levers responsive to operation of the overload safety device. The force of spring 12, indicated at F, biases toggle levers 12 and 17 almost to the fully extended position. When loaded, conveying rake 1 yields through a damping distance, but remains in its operative position until the moment of resistance force P is greater than the spring moment in the toggle joint. Thereupon, the toggle levers kink and conveying rake 1 swings back through the angle α. As it swings back, its restoring force is decreased very rapidly from the adjusted response value, as illustrated by the curve of FIG. 3.

When the transport rake is underload, its resistive force increases to the value $P_{max.}$, whereby leaf spring 13 becomes stretched or elongated. When the load exceeds the resistive force $P_{max.}$, the transport rake disengages and its resistive force drops sharply, as indicated by the shape of curve R. However, in the disengaged or inoperative position, there still remains a residual force tending to turn bearing 15 counterclockwise around crank shaft 5, this residual force acting as a return force through the bolt 14. This brings the transport rake 1 back into its operating position, as it no longer touches the stowed harvested material after leaving the baler 4.

A primary advantage of the invention is the rapid decrease in the restoring force after the response moment of the overload safety device has been exceeded. Consequently, this moment may be adjusted to the actually permissible limit and, until the moment is attained, rake 1 remains in the optimum conveying position for which it is designed. As rake 1 snaps back into its operative position automatically after each flapping into the inoperative position, in many cases it can clear away the obstruction by itself. However, even if this cannot be attained it is possible to continue working immediately, without loss of time, after manual removal of the obstructing material.

While a specific embodiment of the invention has been shown and described in detail to illustrate the application of the principles of the invention, it will be understood that the invention may be embodied otherwise without departing from such principles.

What is claimed is:

1. Conveying rake means, for agricultural harvesting machines and the like, comprising, in combination, a frame; a pivot; a conveying rake swingably mounted on said pivot; means cyclically moving said pivot in a conveying direction; and means, including toggle joint means, connecting said rake to said frame; said toggle joint means including a pair of pivotally interconnected links and spring means biasing said links to a nearly fully extended position holding said rake angularly oriented in an operative position; said links, when said pivot is moving in the conveying direction and the moment on said rake exceeds a predetermined value, swinging toward each other to a contracted position in which said rake is angularly displaced rearwardly of its direction of movement to an inoperative position; said spring means, when said pivot moves said rake in a retracting direction, again biasing said links to such nearly full extended position to angularly displace said rake to said operative position.

2. Conveying rake means, as claimed in claim 1, in which said means cyclically moving said pivot in a conveying direction comprises a constantly rotating crank arm, said pivot being at the outer end of said crank arm.

3. Conveying rake means, as claimed in claim 2, in which said means connecting said rake to said frame includes a rocker pivotally connected at one end to said frame and connected to the free end of one of said links, the free end of the other link being connected to said conveying rake; said rocker controlling said rake during cyclical operation thereof by said crank and said pivot.

4. Conveying rake means, as claimed in claim 3, including adjustment means operatively associated with said toggle joint means and effective to preset the nearly fully extended position of said links.

5. Conveying rake means, as claimed in claim 1, in which one of said links comprises a leaf spring constituting said spring means.

6. Conveying rake means, as claimed in claim 3, in which one of said links comprises a leaf spring constituting said spring means.

7. Conveying rake means, as claimed in claim 3, in which the end of said rocker connected to said one link comprises a bearing head to which said one link is secured, and a brace secured to said bearing head at one end and having its opposite end connected to said rake.

8. Conveying rake means, as claimed in claim 7, in which said one link and said brace comprise leaf springs conjointly clamped at one end in said bearing head, said leaf springs curving away from each other toward their other ends; the leaf spring forming said one link constituting said spring means.

9. Conveying rake means, as claimed in claim 8, in which the leaf spring constituting said brace is curved when said rake is in its operative conveying position to serve for impact damping of said conveying rake.

10. Conveying rake means, as claimed in claim 4, in which said rake includes a hub embracing said pivot; the other of said links comprising a two-arm lever pivotally mounted intermediate its ends on said hub; said adjusting means being interposed between the free arm of said lever and said hub.

References Cited

UNITED STATES PATENTS 2,765,902   10/1956   Myers _____ 198—223

EDWARD A. SROKA, *Primary Examiner.*

EVON C. BLUNK, *Examiner.*